(12) United States Patent
Park et al.

(10) Patent No.: US 12,517,091 B2
(45) Date of Patent: Jan. 6, 2026

(54) APPARATUS FOR AUTOMATICALLY INSPECTING WELDING STATE

(71) Applicants: Hyundai Motor Company, Seoul (KR); Kia Corporation, Seoul (KR); Innereye Inc., Daegu (KR)

(72) Inventors: Yong Bae Park, Suwon (KR); Joon Dong Oh, Suwon (KR); Young Kwon Kim, Seongnam (KR); Ho Jae Shin, Daegu (KR); Baek Young Choi, Daegu (KR)

(*) Notice: Subject to any disclaimer, the term of this patent is extended or adjusted under 35 U.S.C. 154(b) by 380 days.

(21) Appl. No.: 18/128,408

(22) Filed: Mar. 30, 2023

(65) Prior Publication Data

US 2024/0110892 A1 Apr. 4, 2024

(30) Foreign Application Priority Data

Oct. 4, 2022 (KR) .................. 10-2022-0126128

(51) Int. Cl.
| | |
|---|---|
| *B23K 31/12* | (2006.01) |
| *G01N 27/90* | (2021.01) |
| *G01R 31/385* | (2019.01) |
| *H01M 10/42* | (2006.01) |
| *H01M 50/536* | (2021.01) |

(52) U.S. Cl.
CPC ............ *G01N 27/90* (2013.01); *B23K 31/125* (2013.01); *G01R 31/385* (2019.01); *H01M 10/4285* (2013.01); *H01M 50/536* (2021.01)

(58) Field of Classification Search
CPC ........ G01N 27/90; G01N 21/95; G01N 21/01; G01N 21/956; G01N 27/00; G01N 21/8851; B23K 31/125; B23K 2101/36; B23K 2103/18; G01R 31/385; G01R 31/36; H01M 10/4285; H01M 50/536; G06T 7/0004; Y02E 60/10
USPC ....................................... 228/102–104, 8–12
See application file for complete search history.

(56) References Cited

U.S. PATENT DOCUMENTS

| | | | |
|---|---|---|---|
| 2021/0181150 A1* | 6/2021 | Böhm | ................ G01N 27/9006 |
| 2023/0009074 A1 | 1/2023 | Kim | |
| 2024/0110892 A1* | 4/2024 | Park | .................. H01M 10/4285 |

FOREIGN PATENT DOCUMENTS

| | | | | |
|---|---|---|---|---|
| CN | 102481649 A | * | 5/2012 | ......... H10F 71/1375 |
| CN | 116068044 B | * | 7/2023 | ............. G01N 27/90 |
| EP | 4005725 A1 | * | 6/2022 | ......... B23K 37/0426 |
| JP | 2007-121193 A | | 5/2007 | |
| JP | 2011-34731 A | | 2/2011 | |
| JP | 2021-536111 A | | 12/2021 | |
| KR | 2023739 B1 | * | 9/2019 | |
| KR | 102023739 B1 | * | 9/2019 | ......... G01N 27/9006 |
| KR | 20210020576 A | * | 2/2021 | ........ H01M 10/4285 |

(Continued)

OTHER PUBLICATIONS

Park, Yong Bae, Shin, Ho Jae, Kim, Young Kwon, Oh, Jun Dong, and Choi, Baek Young, "Development of Automatic Inspection Technology for High Voltage Battery BMA Lead Welding Quality", Academic conference of Hyundai Motor Group, 9 pages.

*Primary Examiner* — Kiley S Stoner
(74) *Attorney, Agent, or Firm* — Banner & Witcoff, Ltd.

(57) ABSTRACT

An apparatus for automatically inspecting the welding state of a battery module is configured to inspect welding states of welding parts of a plurality of leads for electrical connection based on a deep penetration inspection using application of eddy current to the welding parts of the leads.

20 Claims, 18 Drawing Sheets

(56) References Cited

FOREIGN PATENT DOCUMENTS

| KR | 102227538 B1 | * | 3/2021 | ............. G01N 27/90 |
|---|---|---|---|---|
| KR | 102242248 B1 | | 4/2021 | |
| KR | 20220050379 A | * | 4/2022 | ........... G01R 31/382 |
| KR | 20220090858 A | * | 6/2022 | ........... B23K 31/125 |
| KR | 20220090911 A | * | 6/2022 | ........... B23K 31/125 |
| KR | 20220090975 A | * | 6/2022 | ......... G01N 27/9006 |
| KR | 20220094571 A | * | 7/2022 | ........ H01M 10/4285 |
| KR | 20220095294 A | * | 7/2022 | ........ H01M 10/4285 |
| KR | 20220095318 A | * | 7/2022 | ......... G01N 27/9006 |
| KR | 20220095730 A | * | 7/2022 | ......... G01N 27/9006 |
| KR | 20220157634 A | * | 11/2022 | ........ H01M 10/4285 |
| KR | 20230009134 A | * | 1/2023 | ............. G01N 27/90 |
| KR | 20230057592 A | * | 5/2023 | ........... G01N 27/902 |
| WO | WO-2021020892 A1 | * | 2/2021 | ......... G01N 27/9046 |
| WO | WO-2022097991 A1 | * | 5/2022 | ......... G01N 27/9006 |

* cited by examiner

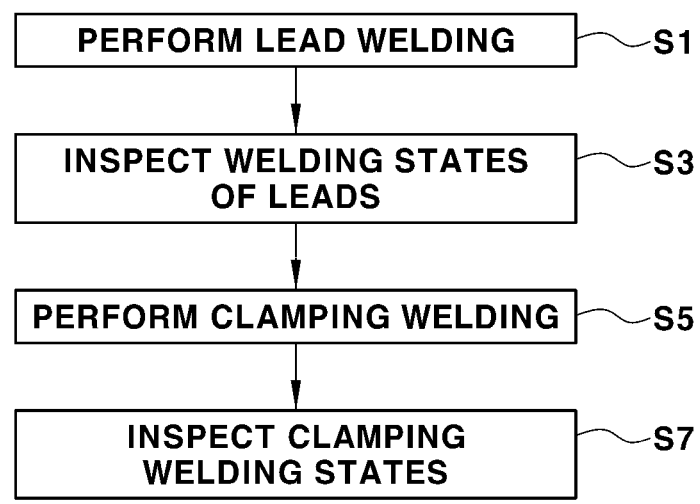

APPARATUS FOR AUTOMATICALLY INSPECTING WELDING STATE

CROSS-REFERENCE TO RELATED APPLICATION

This application claims under 35 U.S.C. § 119(a) the benefit of priority to Korean Patent Application No. 10-2022-0126128 filed on Oct. 4, 2022, the entire contents of which are incorporated herein by reference.

TECHNICAL FIELD

The present disclosure relates to a quality inspection of a welding state. More particularly, it relates to an apparatus for inspecting lead welding of a secondary battery.

BACKGROUND

Secondary batteries are energy storage devices used in various fields, such as electric vehicle technology.

A secondary battery for an electric vehicle may be configured such that, in order to achieve a voltage and capacity sufficient to drive the vehicle, a plurality of battery cells may be stacked to form a battery module, and several battery modules may be assembled into a battery pack finally mounted in the vehicle. The battery module may be formed by assembling a plurality of battery cells, and the battery cells may be welded to establish electrical connection therebetween. Leads of the respective battery cells may be bent and/or bonded, and the bonded leads may be welded (e.g., laser-welded by a laser).

Weld quality attained during this assembly process is crucial in terms of performance of the secondary battery.

The above information disclosed in this Background is only for enhancement of understanding of the background of the disclosure and may contain information that does not form prior art that is already known to a person of ordinary skill in the art.

SUMMARY OF THE DISCLOSURE

The following summary presents a simplified summary of certain features. The summary is not an extensive overview and is not intended to identify key or critical elements. Systems, apparatuses, and methods are described for automatic inspection of a welding state of a battery module. For example, an apparatus for automatically inspecting a welding state of a battery module may comprise a sensor assembly and a controller. The sensor assembly may be configured to apply eddy current to welding parts between a busbar and leads of battery cells in a battery module, and detect signals based on the applied eddy current. The detected signals depend on depths of the welding parts. The sensor assembly may comprise a plurality of sensing parts configured to be movable and to simultaneously contact the welding parts of the battery cells. The controller may be configured to receive the detected signals and determine whether any of the welding parts are defective based on the detected signals.

These and other features and advantages are described in greater detail below.

BRIEF DESCRIPTION OF THE DRAWINGS

The above and other features of the present invention will now be described in detail with reference to certain examples thereof illustrated in the accompanying drawings which are given hereinbelow by way of illustration only, and thus are not limitative of the present disclosure, and wherein:

FIG. 2 is a flowchart representing a method of operating an apparatus for automatically inspecting a welding state according to the present disclosure;

Figure 1A:
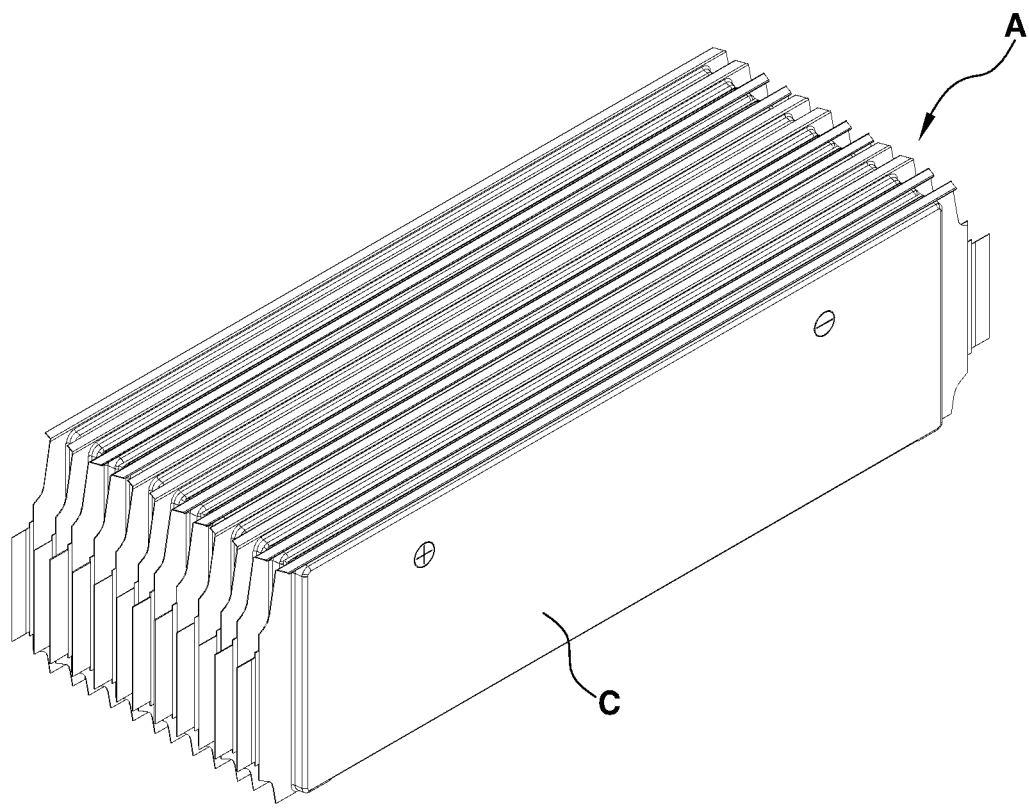
FIG. 1A is a perspective view of a cell stack.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Specific structural or functional descriptions in examples of the present disclosure set forth in the description which follows will be exemplarily given to describe the examples of the present disclosure, and the present disclosure may be embodied in many alternative forms. Further, it will be understood that the present disclosure should not be construed as being limited to the examples set forth herein, and the examples of the present disclosure are provided only to completely disclose the disclosure and cover modifications, equivalents or alternatives which come within the scope and technical range of the disclosure.

In the following description of the examples, terms, such as "first" and "second," are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the disclosure.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

Wherever possible, the same reference numbers will be used throughout the drawings to refer to the same or like parts. The terminology used herein is for the purpose of describing particular examples only and is not intended to be limiting. As used herein, singular forms may be intended to include plural forms as well, unless the context clearly indicates otherwise. The terms "comprising," "including," "having," etc., are inclusive and therefore specify the presence of stated features, integers, steps, operations, elements, components, and/or combinations thereof, but do not preclude the presence or addition of one or more other features, integers, steps, operations, elements, components, and/or combinations thereof.

Hereinafter, a detailed description of the present subject matter will be provided with reference to the accompanying drawings.

Figure 1B:
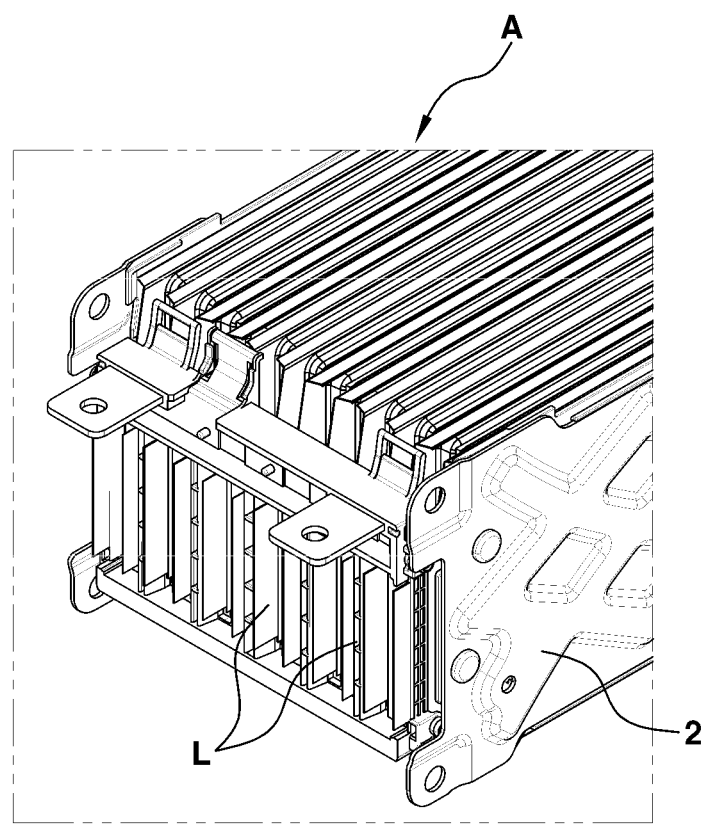
FIG. 1B is a perspective view showing leads of each cell of the cell stack.
Figure 1C:
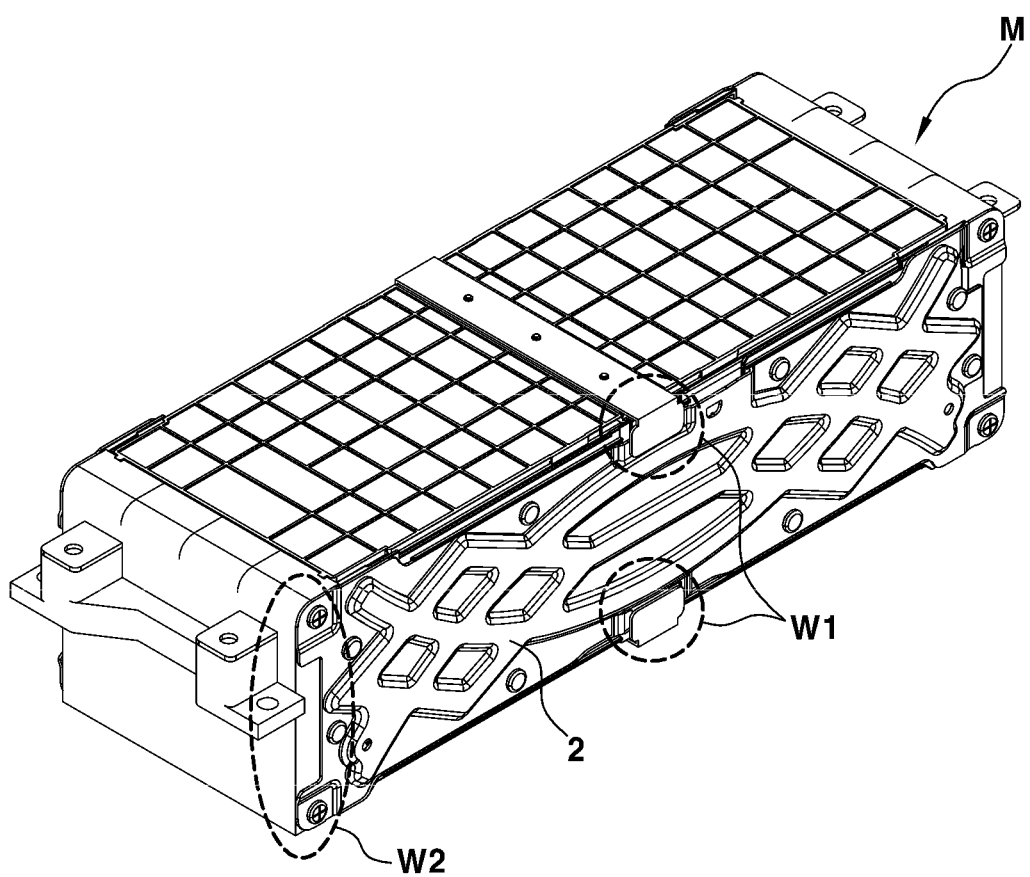
FIG. 1C is perspective view of a battery module acquired by assembling cell stacks.
Figure 1D:
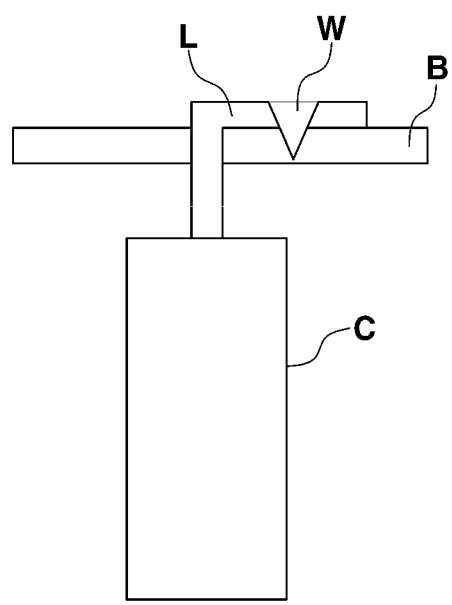
FIG. 1D is a conceptual view showing welding between the lead of a cell forming the battery module and a busbar.

As shown in FIG. 1A, a cell stack A may be formed by stacking a designated number of cells C. As shown in FIG. 1B, a lead L may be connected to each cell C (e.g., bent to electrically connect the cells C). As shown in FIG. 1D, the bent lead L may be welded to a busbar B such that the battery module M (e.g., each battery cell therein) may be in electrical communication.

In a battery, as welding may be performed for each cell C of the battery module M, the number of welded portions may be considerable. For example, assuming that one battery module M includes 12 cells C, welding between busbars and leads is performed at a total 24 spots (i.e., 12 spots at a front of the cell C and 12 spots at a back of the cell) in the 12 cells C. Side welding may be performed by bending leads of the outermost cells laterally (e.g., side welding parts W2 in FIG. 1C). Further, as shown in FIG. 1C, a cover 2 may be coupled to the cells C to assemble the battery module M, which may require a clamping welding (e.g., clamping welding parts W1). Laser welding may be employed as the welding between the busbars B and the leads L, the side welding and the clamping welding. FIG. 1D schematically illustrates an example in which the lead L of the cell C is bent and is welded to the busbar B to form a welding part W.

Weld quality plays a very important role in performance of a battery, so a quality inspection is essential. At present, weld quality is evaluated by a total flip inspection by a worker. The flip inspection is executed by flipping over a part of the tip of each of leads using a tool such as a driver having a sharp end after welding. However, such an operation causes a possibility of missing genuine defects due to human error and requires a considerable amount of labor.

That is, through this inspection method by the worker, it is difficult to accurately and uniformly evaluate the welding states of the welding parts.

Therefore, the present disclosure provides an apparatus for automatically inspecting a welding state, which may automatically, accurately and uniformly inspect the welding state of a battery using a non-destructive.

For this purpose, an apparatus 1 for automatically inspecting a welding state according to the present disclosure may perform an inspection using a vision camera and a deep penetration inspection. As shown in FIG. 2, the apparatus 1 is configured to inspect the welding states of the leads L at S3 immediately after the leads L are welded at S1. Upon determining that the welding states of the leads L satisfy reference quality, clamping welding is done at S5. Subsequently, the welding states of clamping welding parts are inspected at S7. According to the present disclosure, the apparatus 1 may sequentially and automatically perform welding to inspection of weld quality.

Figure 3:
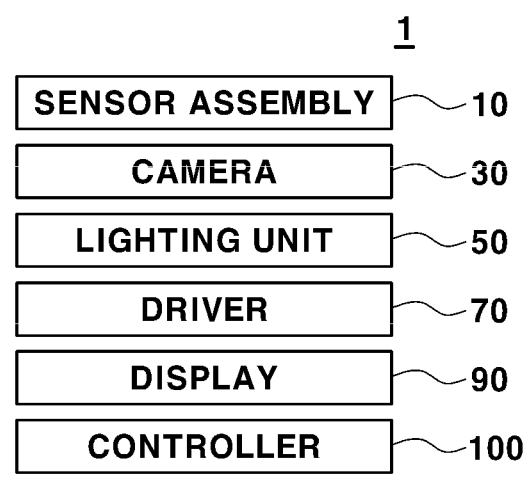
FIG. 3 is a block diagram of the apparatus according to the present disclosure.

The apparatus 1 may comprise, as shown in FIG. 3, a sensor assembly 10, a camera 30, a lighting unit 50, drivers 70, a display 90, and a controller 100. The controller 100 may be configured to control and supervise each component of the apparatus 1 to perform the method of FIG. 2.

The sensor assembly 10 is configured to perform the deep penetration inspection. The deep penetration inspection may be a separate process after welding, and molten states after welding are observed in the deep penetration inspection. Particularly, the deep penetration inspection may be carried out by application of eddy currents. Concretely, the sensor assembly 10 may be configured to apply eddy current to welding parts W and to detect changes in (e.g., differences between) eddy currents depending on the depths of the welding parts W.

Figure 4:
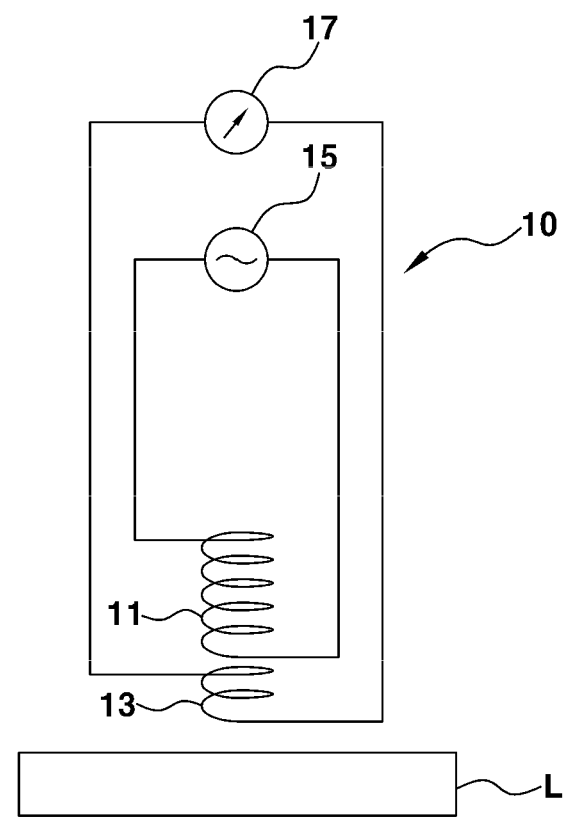
FIG. 4 is a schematic view of a sensor of the apparatus according to the present disclosure.

As shown in FIG. 4, the sensor assembly 10 includes a magnetic field generation coil 11 and a sensing coil 13. When a voltage at a specific frequency is applied to the magnetic field generation coil 11, a primary magnetic field may be generated. The generated primary magnetic field may cause rotational motion of free electrons of a target object to be inspected, i.e., the welded lead L. Such rotational motion is referred to as an eddy current, due to which a secondary magnetic field may be generated. Induced electromotive force may be generated at the sensing coil 13 by the secondary magnetic field, which may be detected (e.g., processed and digitized). In the sensor assembly 10, reference numeral 15 indicates an oscillator, and reference numeral 17 indicates a voltmeter.

An eddy current induced in a target object to be inspected may be attenuated depending on the depth into the target object to be inspected. A degree of attenuation depends on the applied frequency and properties of a material of the target object, such as permeability and conductivity of the material. The frequency may be applied as a constant, so differences in the eddy current are due to different properties of the material, which depend on the welding state of the target object to be inspected. Since permeability and conductivity change depending on the molten depth and size of the welding part, the controller 100 may determine whether the welding part W is, e.g., under welded by obtaining changes in permeability and conductivity based on a detection result by the sensor assembly 10. These changes may be acquired through a phase delay. For example, the welding part W in a normal welding state may exhibit low permeability and conductivity compared to the welding part W in an under welded state. Thus, a welding part W in an under welded state may exhibit a smaller phase delay than the welding part W in the normal welding state.

The standard penetration depth of the welding part W may be inversely proportional to frequency, permeability and conductivity. Moreover, a phase delay at a certain depth of the welding part may be inversely proportional to the standard penetration depth. Since the standard penetration depth of the welding part W in the normal welding state is greater than that of the welding part W in the poor welding state, the permeability and conductivity of the welding part W in the normal welding state may be less than those of the welding part W in the poor welding state. Accordingly, the phase delay of the welding part W in the normal welding state may be less than that of the welding part W in the poor welding state. Based on this principle, but without limitation thereto, the detection result of the welding part W by the sensor assembly 10 may be used as a factor to determine the welding state of the welding part W.

The sensor assembly 10 may include sensing parts. In an example, the sensor assembly 10 may comprise at least as many sensing parts as the number of the cells C in the battery module M. The sensor assembly 10 may be configured to have a plurality of sensing parts such that each sensing part 10', 10" in the sensor assembly 10 can inspect welding states of the leads L at the same time.

Figure 5:
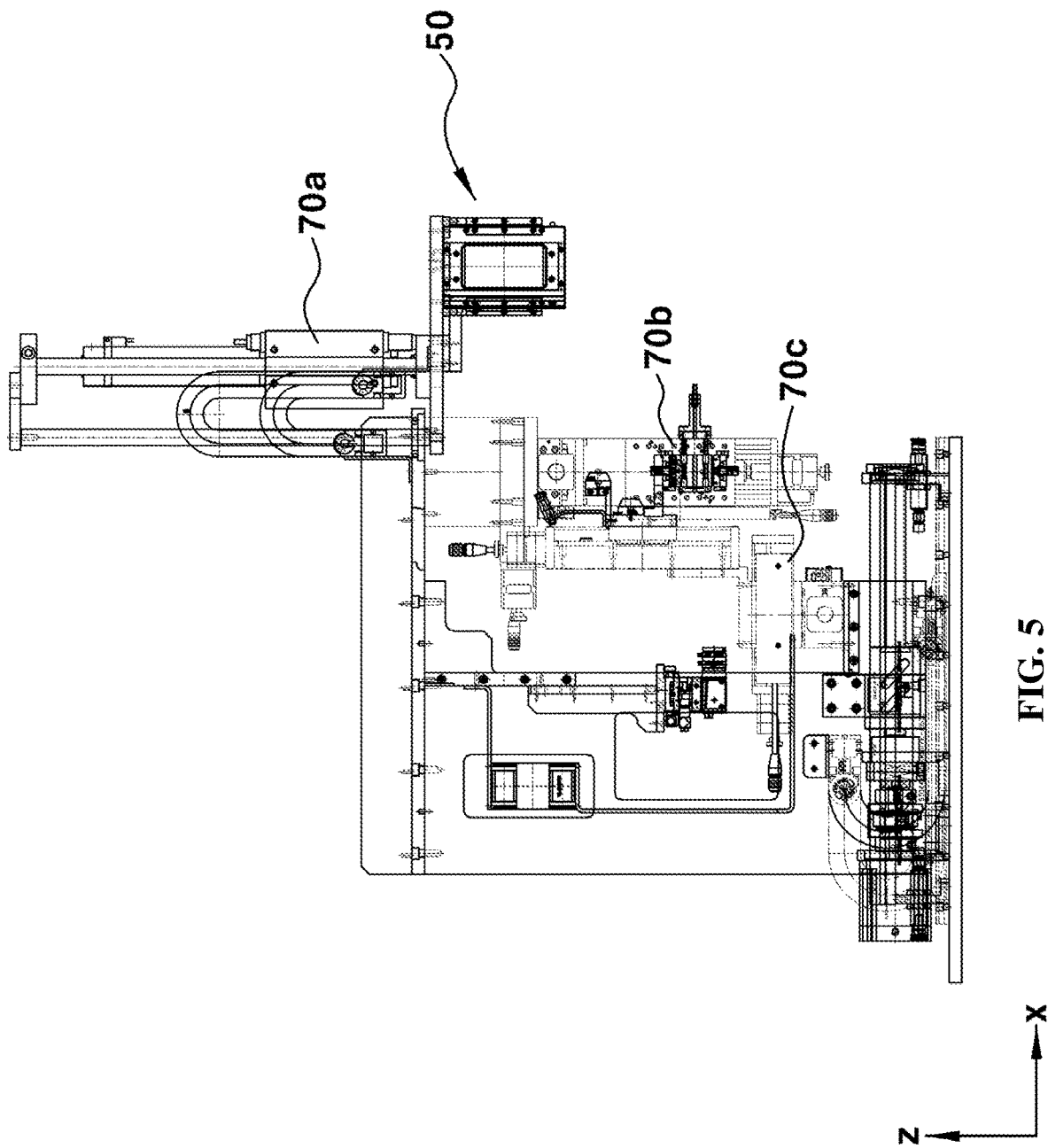
FIG. 5 is a side view of the apparatus according to the present disclosure.

As shown in FIG. 5, the sensor assembly 10 comprising the plurality of sensing parts 10', 10" may be configured to move so as to come into contact with the welded leads L (e.g., configured to move in at least two directions, such as a vertical direction, or Z-axis direction in FIG. 5 and a horizontal direction, or X-direction in FIG. 5). For example, the sensor assembly 10 may comprise or be provided to be movable by drivers 70, which may include z-axis drivers 70a and 70b and an x-axis driver 70c. The drivers 70 may include a linear actuator including an electric cylinder.

Figure 6A:
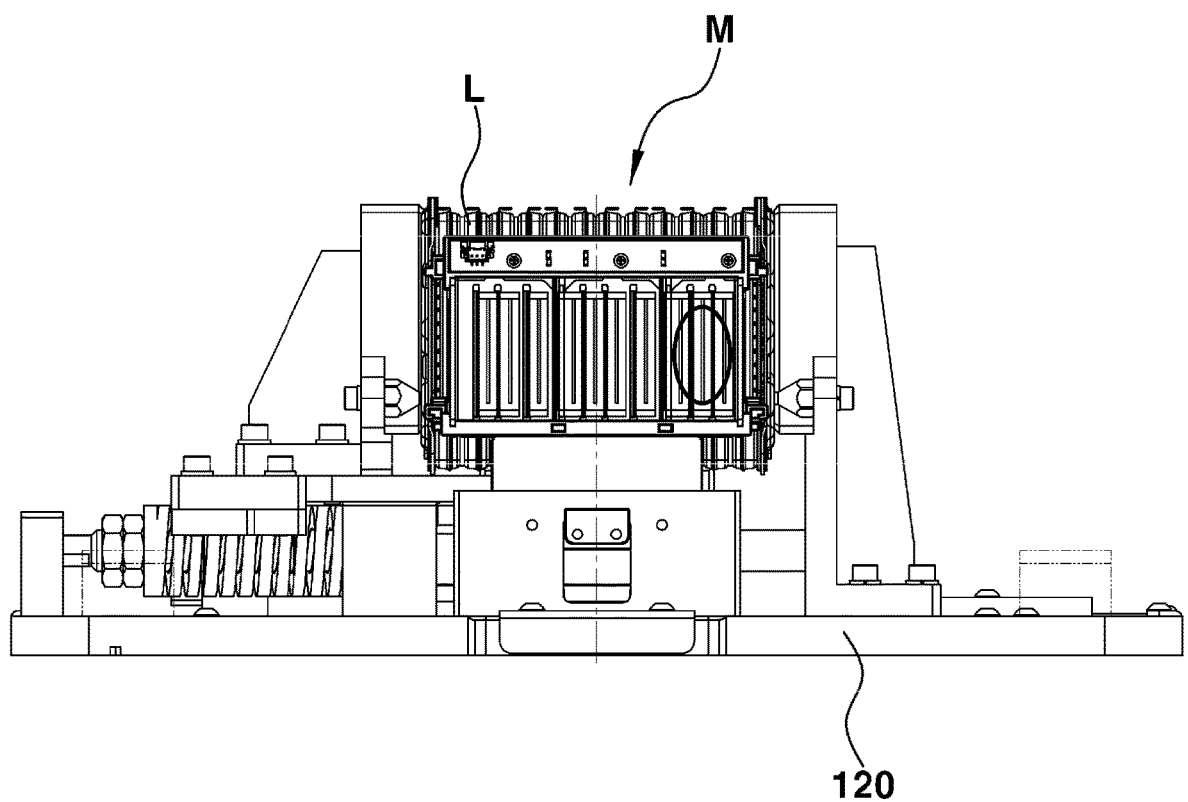
FIG. 6A is a side view showing the state in which a battery module, i.e., a target object to be inspected by the apparatus according to the present disclosure, is mounted on a plate.

The sensor assembly 10 may be able to perform inspection at a plurality of points for each welded lead L of the cell C. For example, the sensor assembly 10 in FIG. 6A may move in the vertical directions (i.e., the Z-axis direction) and sense the welding states of at least five points of the welded lead L.

Figure 6B:
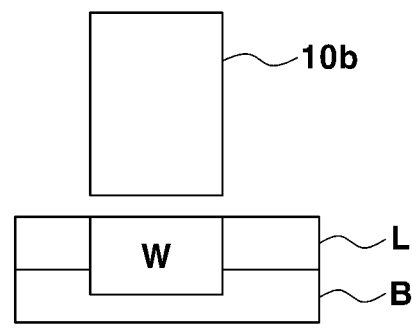
FIGS. 6B and 6C are views comparatively showing the diameters of a side sensor for aluminum leads and a side sensor for copper leads, respectively.
Figure 6C:
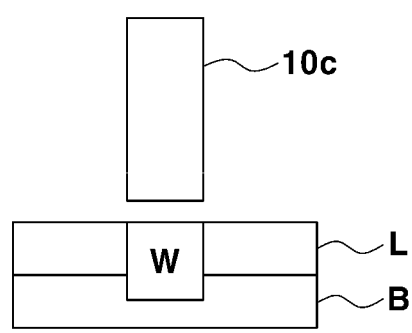

Referring to FIGS. 6B and 6C, during welding of the leads L of the battery module M, the leads include leads of different materials, such as aluminum leads for a positive electrode and copper leads for a negative electrode (for example, welded using side sensors 10b, 10c). Different materials of the leads and/or welds may have a correlation with weld properties (e.g., weld outputs in deep penetration inspection, as discussed herein). Widths of aluminum weld beads may differ due to difference in melting points of materials. To compensate for this difference, the side sensors 10b for aluminum electrode leads and the side sensors 10c for copper electrode leads may be configured to have different diameters. For example, according to the present disclosure, the side sensors 10b for aluminum electrode leads may have a greater diameter than the side sensors 10c for copper electrode leads. According to an example of the present disclosure, the side sensors 10b for aluminum electrode leads having a diameter of 1.48 mm and the side sensors 10c for copper electrode leads having a diameter of 1.19 mm may be used at an applied frequency of 80 kilohertz (kHz). Under this setup, it was found that the resolution of the side sensors 10c for copper electrode leads is improved.

Figure 7A:
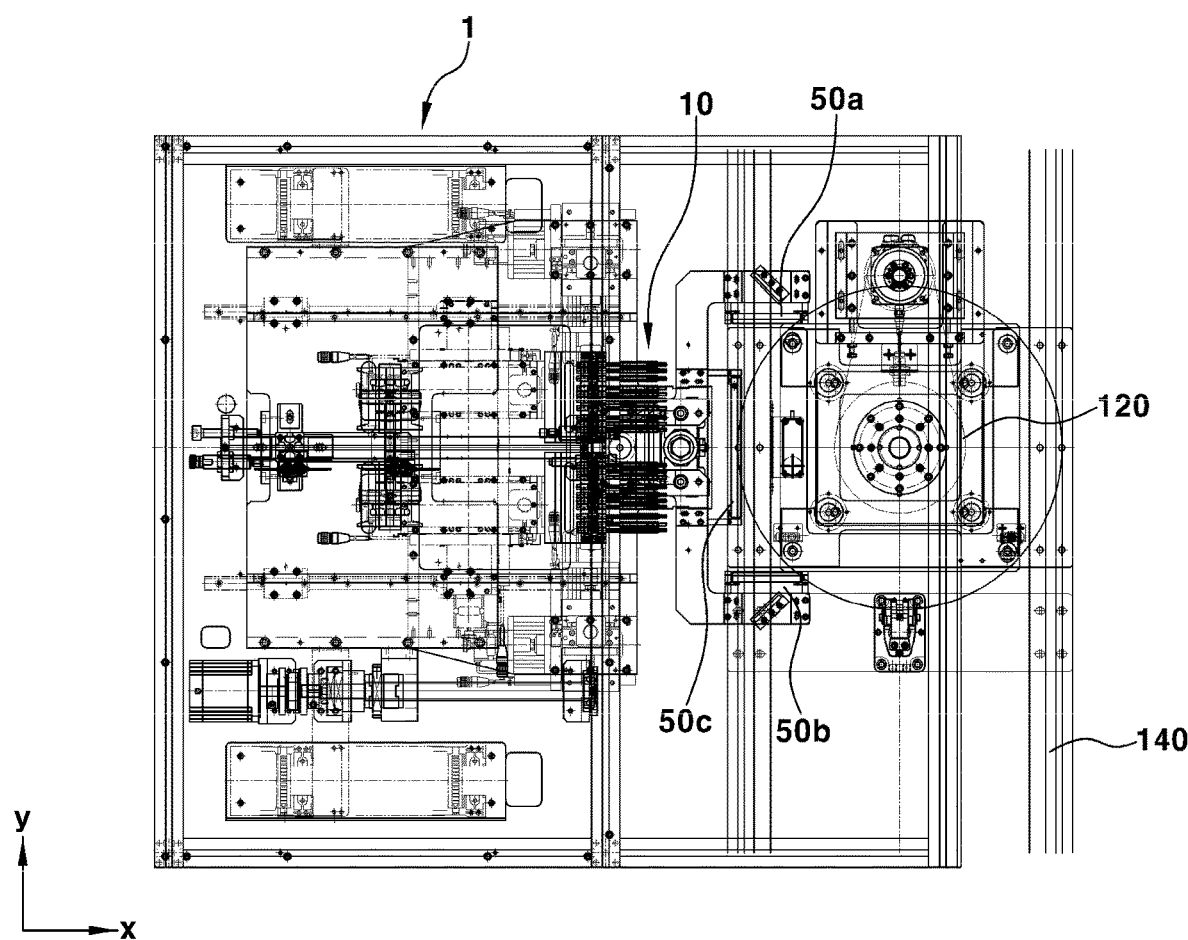
FIG. 7A is a plan view of the apparatus according to the present disclosure.
Figure 7B:
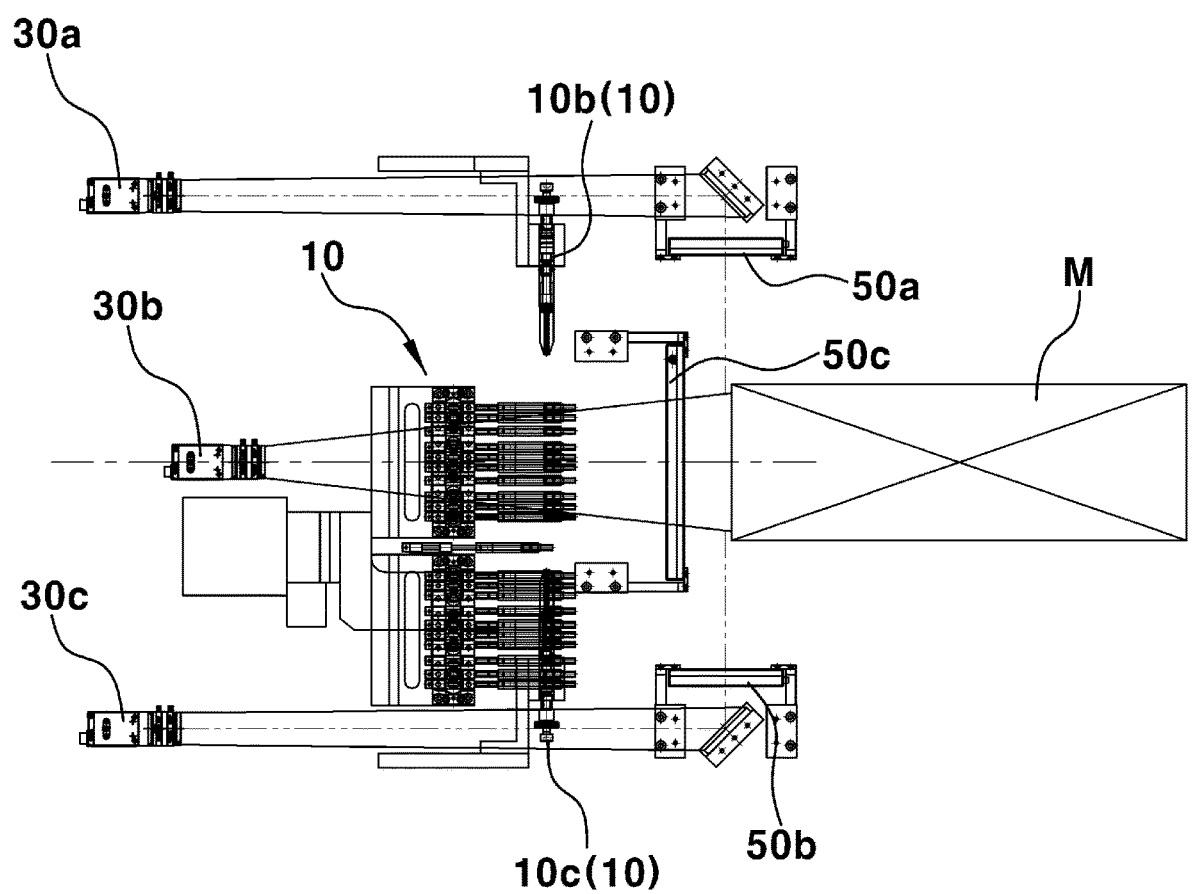
FIG. 7B is a partial plan view of the apparatus according to the present disclosure.

Referring to FIGS. 7A and 7B, one or more cameras 30 (e.g., cameras 30a, 30b, 30c in FIG. 7B) may be provided in the apparatus 1 and configured to perform and/or allow the controller or another computing device to perform machine vision inspection. The lengths of the welding parts, the widths of the weld beads, the number of pores, the sizes of the pores, etc., may be evaluated based on images captured by the cameras 30. The one or more cameras 30 may include at least three cameras 30a, 30b, 30c, configured to capture images of the welds from different perspectives. Side cameras 30a, 30c may be configured to capture the side welding states of the battery module M. The front camera 30b may be configured to capture the front or back welding states of the battery module M. Inspection of the side welding parts may be achieved by the above-described side sensors 10b, 10c.

Figure 8:
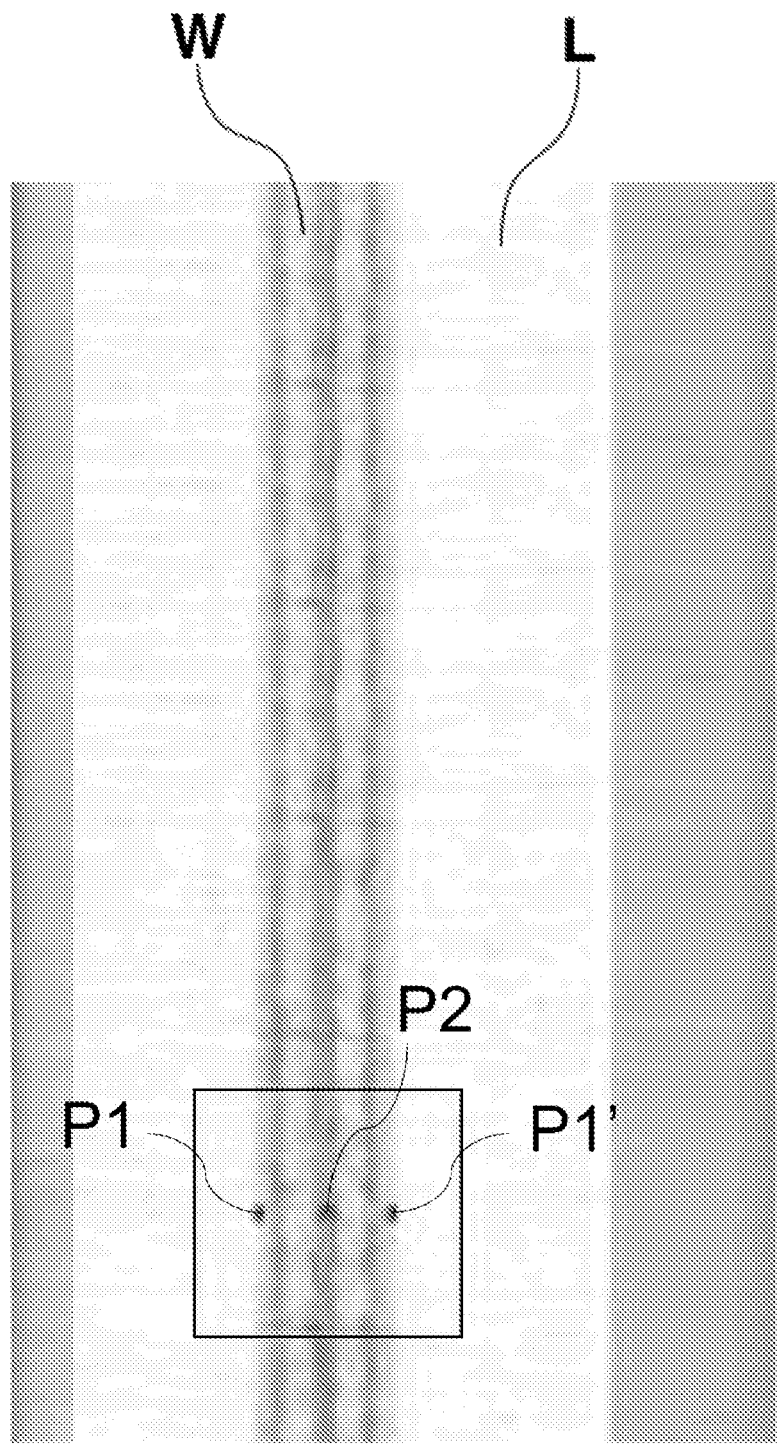
FIG. 8 is an enlarged view of a portion marked as a circle in FIG. 6A.

Further, the cameras 30 may be configured to determine the centers of the weld beads in the deep penetration inspection. As shown in FIG. 8, the cameras 30 may be configured to capture images that provide information to numerically confirm the coordinates of the center of the weld bead or the welding part W. This information may be used to then sense the weld bead or the welding part W. The cameras 30 may capture images displaying two points P1, P1' at sides of the weld bead or welding part W and one midpoint P2 of the weld bead or the welding part W in the width direction thereof determined through numerical analysis.

Figure 9:
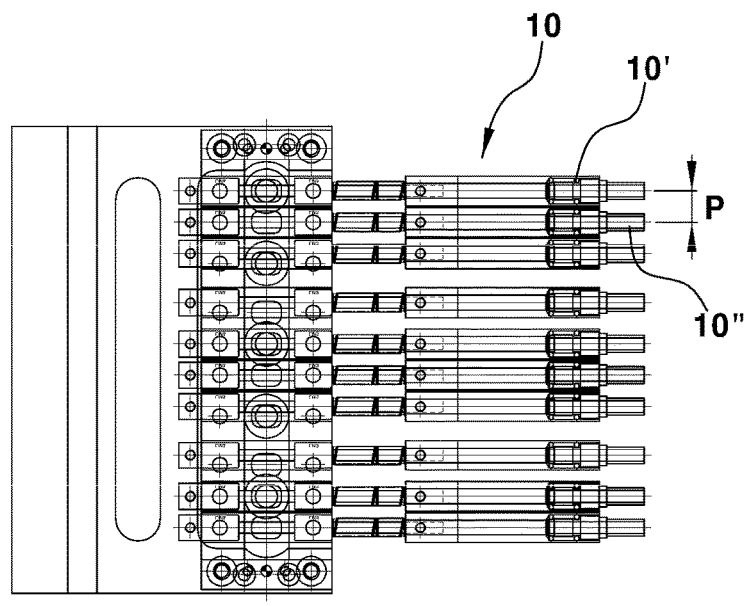
FIG. 9 is a plan view of the sensor of the apparatus according to the present disclosure.

Referring to FIG. 9, a pitch (i.e., a pitch between the centers of the neighboring weld beads) determined during welding may be used as a pitch P of the sensor assembly 10 (e.g., a distance between the sensing part 10' and the sensing part 10"). Since the radiated position of a laser beam is determined during laser welding, the pitch P may be determined based on the radiated position of the laser beam. In other words, the pitch P of the sensor assembly 10 may be predetermined to measure the determined central parts of the weld beads. However, the sensor assembly 10 may be designed to be manually or otherwise operated so that the pitch P thereof may be arbitrarily adjusted. For example, whether the sensing parts 10', 10" of the sensor assembly 10 are correctly positioned at the coordinates of the centers of the welding parts W may be determined by comparing the position of the sensing parts 10', 10" with the coordinates of the centers of the welding parts W determined based on the images captured by the cameras 30.

In some examples, the sensor assembly 10 may include a pogo pin-type sensor. Since sensing is performed through contact with the weld beads, the sensor assembly 10 may use the pogo pin-type sensors, but is not limited thereto and may use different types of sensors.

Referring again to FIG. 5, the lighting unit 50 may be operated when images are captured by the cameras 30. The lighting unit 50 may be configured to be movable in the upward and downward directions (i.e., the Z-axis direction) so that the target object to be inspected, i.e., the battery module M, may be inserted into the apparatus 1 to be captured by the cameras 30 under the lighting condition provided by the lighting unit 50. The lighting unit 50 may be mounted on the Z-axis driver 70a and may be controlled to be movable upwards and downwards. The lighting unit 50 may also or alternatively be mounted on and/or provided with another driver configured to adjust lighting direction and position as needed.

Figure 10:
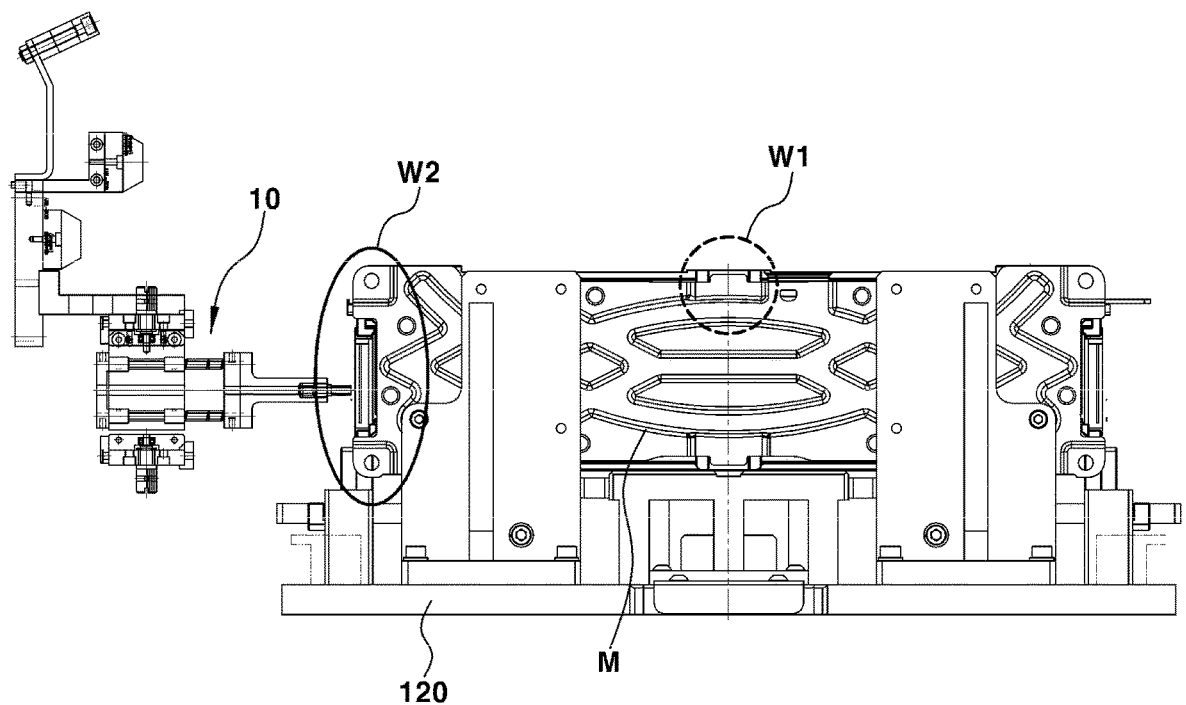
FIG. 10 is a side view showing the state in which a battery module, i.e., a target object to be inspected by the apparatus according to the present disclosure, is mounted on a plate.

As described above, the drivers 70 may include the X-axis driver 70c and the Z-axis drivers 70a, 70b. Also, or alternatively, the drivers 70 may include additional drivers which are not shown in the drawings. For example, a plate 120 on which the battery modules M are mounted may be configured to be movable on a transfer rail 140. Since the plate 120 on which the battery module M is placed is continuously supplied while the apparatus 1 performs an inspection, continuous and automatic inspection may be feasible. Further, the plate 120 may be configured to be rotatable. After the welding states of the leads of a front surface of the battery module M have been inspected, the plate 120 may be rotated to allow for inspecting the welding states of the leads of the rear surface of the battery module M. Also, as shown in FIG. 10, the plate 120 may be rotated to allow for the side welding parts W2 and the clamping welding parts W1 to be inspected. The plate 120 may be driven by the drivers 70. The drivers 70 may employ well-known devices, such as motors, cylinders, etc., without being limited to the drivers illustrated in the drawings.

The apparatus 1 may further include a display 90. The display 90 may comprise an interface to allow a worker to view sensor output and may provide results of the vision inspection and the deep penetration inspection to the worker. In addition, the display 90 may generate a notification when the welding state of any welding part W is poor and/or may display an indication of a corresponding cell C.

The controller 100 may be configured to control one or more of the components of the apparatus 1 and/or to output inspection results through the display 90. In some examples, the controller 100 may be configured to control detection and movement of the sensor assembly 10. In some examples, the controller 100 may instruct the cameras 30 to capture images and may control light radiation and movement of the lighting unit 50. In some examples, the controller 100 may drive the drivers 70 to move or rotate the related elements.

Figure 11A:
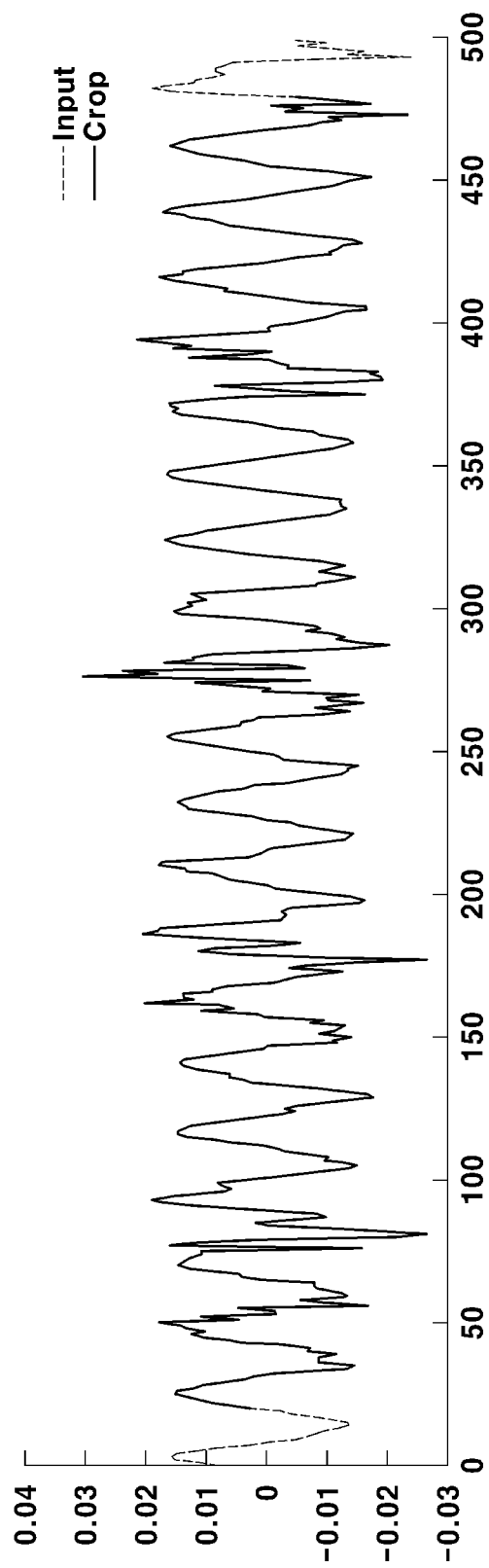
FIG. 11A to 11C are graphs representing a process of removing noise in the apparatus according to the present disclosure.
Figure 11B:
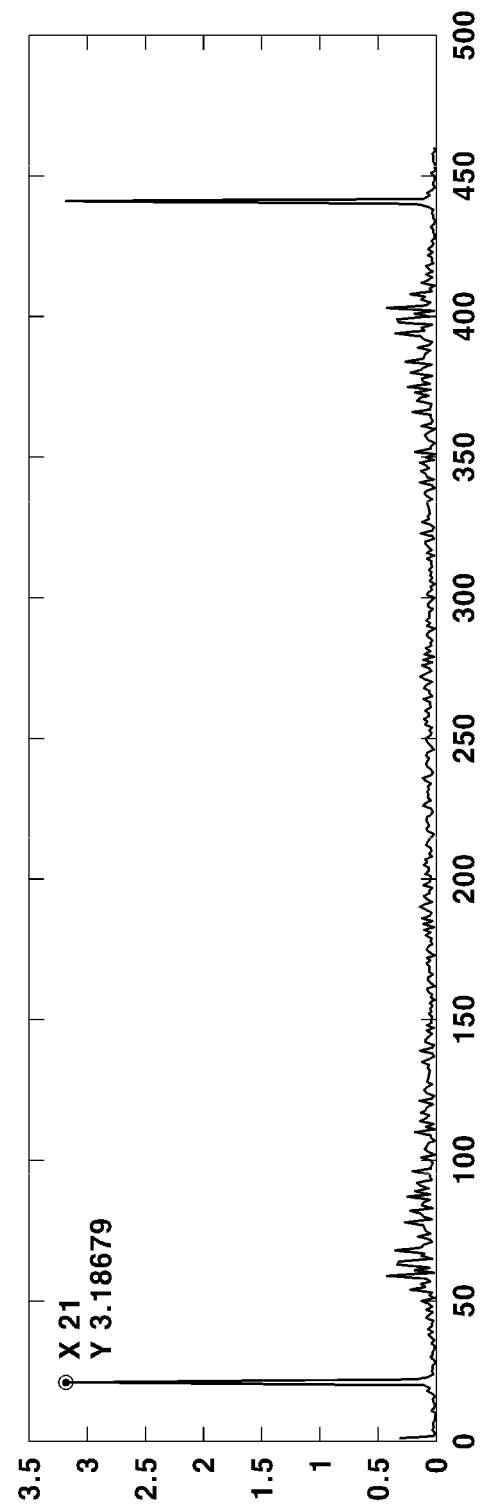
Figure 11C:
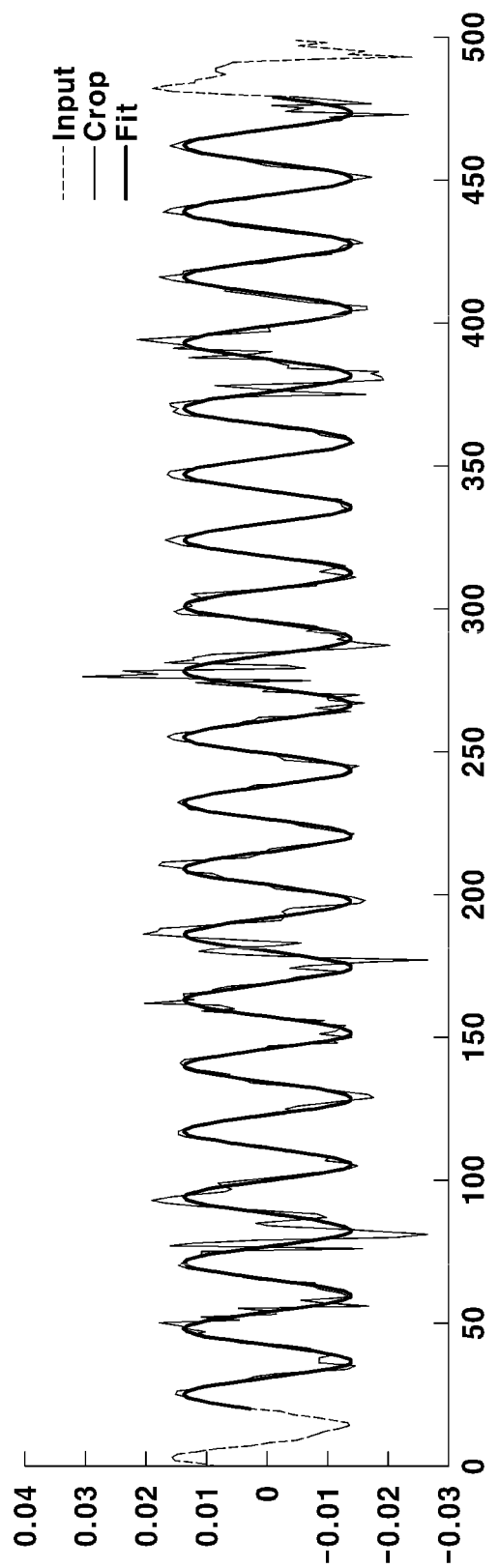
Figure 12:
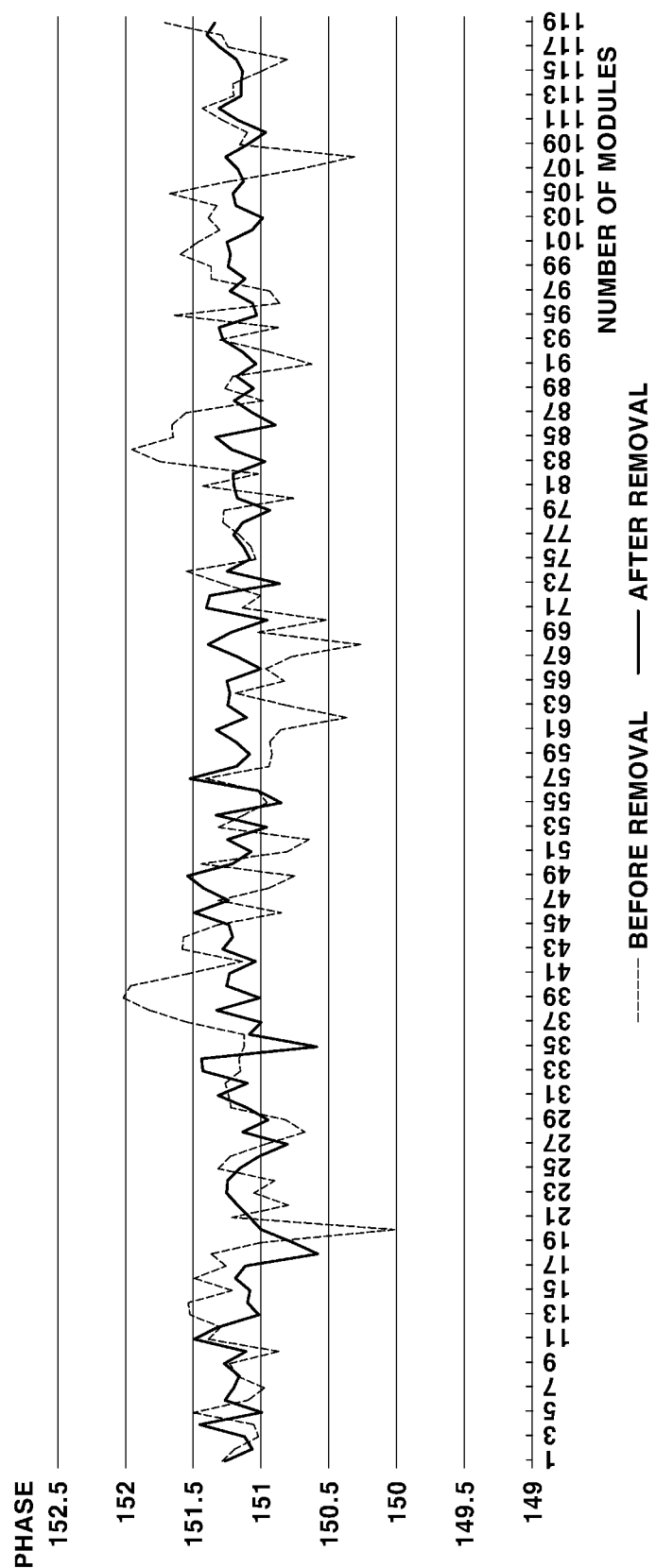
FIG. 12 is a graph representing comparison results between signals processed by noise removal algorithm and signals not processed thereby.

Further, the controller 100 may provide more accurate results by removing noise from inspection signals or acquired phase delay signals. In FIG. 11A, a sharp point in an inspection signal (Input) indicates a noise component. Using the zero-crossing point of a graph, the controller 100 may perform a data crop in which a section of the signal Input is cut off (cropped) so that a periodic signal is normally repeated. Furthermore, as shown in FIG. 11B, the controller 100 (or another computing device) may perform a Fast Fourier Transform (FFT) on cropped data and may detect the maximum frequency component(s). The controller 100 may extract the detected frequency component by setting frequency components other than the detected frequency component to zero. As shown in FIG. 11C, the controller 100 restores the frequency components through Inverse Fast Fourier Transform (IFFT) and compares the restored frequency components with the original signal. FIG. 12 shows comparison results between measured data, to which such noise removal algorithm is applied by the controller 100, and measured data, to which the noise removal algorithm is not applied.

The apparatus 1 according to the present disclosure may be operated as below.

Target objects to be inspected, e.g., battery modules M, may be mounted on the plate 120. The plate 120 may be disposed on the transfer rail 140 and sent to the apparatus 1. Here, a plurality of plates 120 may be disposed on the transfer rail 140 to be spaced apart from each other by a designated distance and may be sequentially fed to the apparatus 1 to be inspected.

Thereafter, the welding states of the leads of the front surface of the battery module M may be captured by the camera(s) 30. The centers of weld beads to be inspected are determined based on the images captured by the cameras 30.

The controller 100 may move the sensor assembly 10 using the drivers 70 and operates the sensor assembly 10 to inspect the welding states at a plurality of points of the determined centers of the weld beads. Information read by the sensor assembly 10 may be transmitted to the controller 100 to be analyzed.

Thereafter, the controller 100 may rotate the plate 120 by 180 degrees. Thereby, the welding states of the leads of the rear surface of the battery module M may be inspected. In the same manner as inspection of the front surface of the battery module M, the welding states of the leads of the rear surface of the battery module M may be captured by the cameras 30, and the centers of weld beads to be inspected may be determined based on the captured images.

The controller 100 may cause (e.g., operate one or more components of and/or send signals to cause operation of one or more components of) the sensor assembly 10 to inspect the welding states at a plurality of points of the determined centers of the weld beads. The sensor assembly 10 may transmit inspection results to the controller 100. In addition, the welding states of the left and right surfaces of the battery modules M may be determined using the side sensors 10b, 10c.

The controller 100 may output inspection results via the display 90 and may output information indicating any cells C corresponding to leads which are in the defective welding state. The output information may be viewable and/or readable by a worker, for example.

As described above, the apparatus 1 according to the present disclosure may automatically inspect not only the appearances of weld beads but also the welding (molten) states thereof.

The present disclosure provides an apparatus for automatically inspecting a welding state which may reduce labor-related costs.

Further, the present disclosure provides an apparatus for automatically inspecting a welding state with accurate and reliable results.

As is apparent from the above description, the present disclosure provides an apparatus for automatically inspecting the welding state of a battery module in a non-destructive manner.

Further, the present disclosure provides an apparatus for automatically inspecting the welding state of a battery module, which may provide accurate and uniform results.

The present disclosure has been made in an effort to solve problems associated with the prior art, and it is an object of the present invention to provide an apparatus for automatically inspecting the welding state of a battery module in a non-destructive manner.

It is another object of the present disclosure to provide an apparatus for automatically inspecting the welding state of a battery module, which may provide accurate and consistent results.

In one aspect, the present disclosure provides an apparatus for automatically inspecting a welding state of a battery module. A plurality of battery cells is assembled in the battery module, a lead connected to each battery cell is welded to a busbar for electrical communication, and the apparatus is configured to inspect welding parts between each lead of the battery cells and the busbar. The apparatus comprises: a sensor assembly configured to apply eddy current to the welding parts and to detect signals about changes in the eddy current depending on depths of the welding parts, wherein the sensor assembly includes a plurality of sensing parts configured to be integrally movable and to simultaneously come into contact with the welding parts of each battery cell; and a controller configured to receive the signals about the changes in the eddy current, detected by the sensor assembly and to determine whether the welding parts are defective based on the signals about the changes in the eddy current.

An apparatus may automatically inspect a welding state of a battery module, wherein a plurality of battery cells is assembled in the battery module, a lead connected to each battery cell is welded to a busbar for electrical communication, and the apparatus is configured to inspect welding parts between each lead of the battery cells and the busbar. The apparatus may comprise: a sensor assembly configured to apply eddy current to the welding parts and to detect signals about changes in the eddy current depending on depths of the welding parts, wherein the sensor assembly includes a plurality of sensing parts configured to be integrally movable and to simultaneously come into contact with the welding parts of each battery cell; and a controller configured to receive the signals about the changes in the eddy current, detected by the sensor assembly and to determine whether the welding parts are defective based on the signals about the changes in the eddy current.

The sensing parts may be configured to simultaneously move in a length direction of the welding parts of the battery cells and to detect welding states at a plurality of points on each of the welding parts.

The sensor assembly may further comprise side sensors disposed at sides of the battery cells, wherein the side sensors are configured to detect welding states between copper leads and aluminum leads and the busbars on side surfaces of the battery cells, respectively.

The side sensors for the copper leads may have a smaller diameter than a diameter of the side sensors for the aluminum leads.

The apparatus may further comprise a camera configured to capture images of the welding parts, wherein vision inspection of the welding parts is performed based on the images captured by the cameras.

The controller may determine centers of the welding parts to be detected by the sensor assembly based on the images captured by the cameras.

The sensor assembly may detect the welding states of the welding parts while moving along the determined centers of the welding parts.

The signals about the changes in the eddy current may be processed as phase delay signals, and the controller determines whether the welding parts are defective based on the phase delay signals.

The controller may be configured to acquire corrected phase delay signals by removing noise from the phase delay signals and to determine whether the welding parts are defective based on the corrected phase delay signals.

The controller may be configured to: select a zero-crossing point from the phase delay signals and crop the phase delay signals based on the selected zero-crossing point; extract a predetermined frequency component by applying Fourier Transform to the cropped phase delay signals and cancel frequency components other than the extracted frequency component; and restore the cancelled frequency components using Inverse Fast Fourier Transform (IFFT) and compare the restored frequency components with the phase delay signals so as to acquire the corrected phase delay signals.

The disclosure includes a detailed description of the subject matter with reference to preferred examples thereof. However, it will be appreciated by those skilled in the art that changes may be made in these examples without departing from the principles and spirit of the disclosed subject matter, the scope of which is defined in the appended claims and their equivalents.

What is claimed is:

1. An apparatus for automatically inspecting a welding state of a battery module, the apparatus comprising:
    a sensor assembly configured to:
        apply eddy current to welding parts between a busbar and leads of battery cells in a battery module, and
        detect signals based on the applied eddy current, wherein the detected signals depend on depths of the welding parts, wherein the sensor assembly comprises a plurality of sensing parts configured to be movable and to contact the welding parts of the battery cells;
    a camera configured to capture images of the welding parts; and
    a controller configured to:
        receive the detected signals;
        determine the welding parts based on the images captured by the cameras;
        determine centers of the welding parts to be detected by the sensor assembly based on the images captured by the camera; and
        determine whether any of the welding parts are defective based on the detected signals.

2. The apparatus of claim 1, wherein the plurality of sensing parts are configured to move in a length direction of the welding parts of the battery cells and to detect welding states at a plurality of points on each of the welding parts.

3. The apparatus of claim 1, wherein the sensor assembly further comprises side sensors configured to detect welding states between a plurality of leads on side surfaces of the battery cells and busbars, wherein the plurality of leads on the side surfaces of the battery cells comprise one or more copper leads and one or more aluminum leads.

4. The apparatus of claim 3, wherein one or more side sensors, of the side sensors, for the one or more copper leads have a smaller diameter than a diameter of one or more side sensors, of the side sensors, for the aluminum leads.

5. The apparatus of claim 1, further comprising one or more light units configured to illuminate at least one battery cell, of the battery cells, captured by the camera.

6. The apparatus of claim 1, further comprising a display configured to output a notification based on the welding parts being defective.

7. The apparatus of claim 2, wherein the sensor assembly is configured to detect the welding states of the welding parts along the determined centers of the welding parts.

8. The apparatus of claim 1, wherein the controller is configured to determine whether any of the welding parts are defective based on phase delay signals based on the detected signals.

9. The apparatus of claim 8, wherein the controller is configured to determine corrected phase delay signals by removing noise from the phase delay signals and to determine whether the welding parts are defective based on the corrected phase delay signals.

10. The apparatus of claim 9, wherein the controller is configured to:
    select a zero-crossing point from the phase delay signals and crop the phase delay signals based on the selected zero-crossing point;
    extract a predetermined frequency component by applying Fourier Transform to the cropped phase delay signals and cancel frequency components other than the extracted frequency component; and
    restore the cancelled frequency components using an Inverse Fast Fourier Transform (IFFT) and compare the restored frequency components with the phase delay signals so as to determine the corrected phase delay signals.

11. An apparatus for automatically inspecting a welding state of a battery module, the apparatus comprising:
a sensor assembly configured to:
apply eddy current to welding parts between a busbar and leads of battery cells in a battery module, and
detect signals based on the applied eddy current, wherein the detected signals depend on depths of the welding parts, wherein the sensor assembly comprises a plurality of sensing parts configured to be movable and to contact the welding parts of the battery cells; and
a controller circuit configured to:
receive the detected signals, and
determine whether any of the welding parts are defective based on the detected signals,
wherein the plurality of sensing parts are aligned in a first direction, and wherein each sensing part of the plurality of sensing parts is configured to move along each welding part in a second direction and to detect welding states at a plurality of points on each welding part, the second direction being perpendicular to the first direction.

12. The apparatus of claim 11, further comprising a linear actuator providing power to move the plurality of sensing parts in the second direction.

13. The apparatus of claim 11, further comprising a camera configured to capture an image of the welding parts.

14. The apparatus of claim 13, wherein the controller circuit is further configured to determine a center of each welding part based on the image, and the sensor assembly is configured to detect a welding state of each welding part at the center of each welding part.

15. An apparatus for automatically inspecting a welding state of a battery module, the apparatus comprising:
a sensor assembly configured to:
apply eddy current to welding parts between a busbar and leads of battery cells in a battery module, and
detect signals based on the applied eddy current, wherein the detected signals depend on depths of the welding parts, wherein the sensor assembly comprises a plurality of sensing parts configured to be movable and to contact the welding parts of the battery cells; and
a controller circuit configured to:
receive the detected signals;
determine whether any of the welding parts are defective based phase delay signals based on the detected signals;
determine corrected phase delay signals by removing noise from the phase delay signals; and
determine whether the welding parts are defective based on the corrected phase delay signals.

16. The apparatus of claim 15, wherein the controller circuit is configured to:
select a zero-crossing point from the phase delay signals and crop the phase delay signals based on the selected zero-crossing point;
extract a predetermined frequency component by applying Fourier Transform to the cropped phase delay signals and cancel frequency components other than the extracted frequency component; and
restore the cancelled frequency components using an Inverse Fast Fourier Transform (IFFT) and compare the restored frequency components with the phase delay signals so as to determine the corrected phase delay signals.

17. The apparatus of claim 15, further comprising a camera configured to capture images of the welding parts, wherein the controller circuit is further configured to determine the welding parts based on the images captured by the camera and to determine centers of the welding parts to be detected by the sensor assembly based on the images captured by the camera.

18. The apparatus of claim 17, further comprising one or more light units configured to illuminate the welding parts captured by the camera.

19. The apparatus of claim 15, wherein the sensor assembly further comprises side sensors configured to detect welding states between a plurality of leads on side surfaces of the battery cells and busbars, wherein the plurality of leads on the side surfaces of the battery cells comprise one or more copper leads and one or more aluminum leads, and wherein one or more side sensors, of the side sensors, for the one or more copper leads have a smaller diameter than a diameter of one or more side sensors, of the side sensors, for the aluminum leads.

20. The apparatus of claim 15, further comprising a display configured to output a notification based on the welding parts being defective.

* * * * *